Patented May 25, 1937

2,081,609

UNITED STATES PATENT OFFICE 2,081,609

METHOD OF PREVENTING EFFLORESCENCE ON THE SURFACE OF COLORED ROOFING GRANULES

Paul Teetor, Castleton, Vt., assignor to Central Commercial Company, a corporation of Illinois No Drawing. Application December 4, 1934
Serial No. 756,006

8 Claims. (Cl. 91—70)

This invention relates to the coloring of granules for use in composition roofing, and more particularly to the method of treating the coloring composition to prevent subsequent blooming or efflorescence on the surface of the colored granules.

The principal object of the invention is the prevention of blooming or efflorescence on the surface of roofing granules subsequent to artificially coloring the same.

Another object of the invention is the provision of a new and improved binder for securing color pigment to the surfaces of roofing granules.

A still further object of the invention is the provision of a new and improved method of coloring granules and preventing the subsequent blooming or efflorescence on the colored surfaces of the same that is practical, economical and which may be performed with efficiency.

Other and further objects and advantages of the invention will appear as the description proceeds.

In the preparation of prepared or composition roofing, granules of different colors are employed, and while some of the granules are of the natural color, for the most part the desired color is obtained by coating the granules with a coat of cementitious material, in which sufficient color pigment is mixed to give the finished product the desired hue or color.

Various methods have been proposed for attaching color pigment to the granules. In certain types the cement employed hardens at atmospheric temperatures, while in others the cementitious material which may be termed an igneous binder can only be applied to the granule by fusing the same thereon.

The present invention relates to the latter type.

In the use of frits and other materials as a binder for applying the color pigment to the granule by fusion, it was fund that on subsequent exposure to dampness and drying, certain of the materials used would cause blooming or would effloresce on the surface of the coating. It is not understood just what is the composition of the bloom since neither slate nor quartz granules contain sufficient sulphates to cause blooming. It would appear that the effloresced material is not a sulphate. In fact, the major portion of the bloom appears to be calcium carbonate.

But whatever it is, it has been found by experiment that when a small amount of barium carbonate is employed in the mix for the color coating, the bloom is either entirely eliminated or is reduced to such an extent as to be negligible. Various theories may be advanced as to the chemical reaction which takes place, but since this is a mere matter of opinion, it is not thought necessary to advance any theory but to state the facts with reference to the coloring of granules.

Barium carbonate has been used with frit, pigment and sodium silicate on granules of slate, greenstone, shale and trap rock, and with the raw ingredients of a frit or glaze and pigment on quartz base granules with excellent results. The raw ingredients of a frit consist of borax, whiting, sodium nitrate, soda ash (carbonate), china clay, feldspar and lead oxide.

To each ton of granules used, the following formulas have been found to give satisfactory results for granules having a slate and a quartz base:

(1) For a slate base

|  | Lbs. | Usual Lbs. |
|---|---|---|
| Frit | 20–60 | 40 |
| Pigment | 10–25 | 18 |
| Sodium silicate | 0–60 | 10 |
| Barium carbonate | 5–20 | 15 |

(2) For a quartz base

|  |  | Usual |
|---|---|---|
| Borax | 10–30 | 20 |
| Whiting | 1–10 | 9 |
| Barium carbonate | 5–20 | 5 |
| Sodium nitrate | 0– 5 | 5 |
| Soda ash | 2–10 | 6 |
| China clay | 0– 5 | 1 |
| Pigment | 9–25 | 14 |
| Cobalt oxide | 0– 0.5 | 0 |
| Feldspar | 0–10 | 0 |

With reference to Formula No. 1, varying amounts of frit and frits of different composition may be used. The same may be used on granules of different material. The frits used have been of low fusing point, and have either been of the lead base type or high soda type, carrying some amounts of cryolite or fluospar as additional fluxing agents.

It has been found that the amount of barium which is sometimes found in and forms part of the frit is of no value in preventing the bloom or efflorescence. After the material has been added to the granules and thoroughly stirred, the same is subjected to heat to fuse the composition onto the surface of the granules. During the operation, or as long as necessary during the operation, the granules are agitated to prevent agglomeration.

While the invention is disclosed more or less in detail, it is understood that the formulas enumerated are by way of example only, and that changes in the materials and their proportions may be made without departing from the spirit and scope of the appended claims.

I claim as my invention:—

1. A method of preventing subsequent efflorescence on the surface of slate granules which consists in mixing barium carbonate with the color pigment and an igneous binder and then fusing the binder on the granules.

2. A method of treating granules suitable for use on roofing material which comprises mixing barium carbonate, color pigment and a binder containing frit, mixing the mass with granules, fusing the binder on the granules and agitating the mass to prevent agglomeration.

3. A method of coloring roofing granules and for preventing subsequent efflorescence on the surface of the colored granules which comprises mixing a color pigment with an igneous binder containing frit of the lead base type and barium carbonate, then fusing the binder on the granules and agitating the mass to prevent agglomeration of the granules after the binder is fused.

4. A binder for attaching color pigments to the surface of granules having a slate base which comprises the following:—

| | Pounds |
|---|---|
| Frit | 20–60 |
| Sodium silicate | 0–60 |
| Barium carbonate | 5–20 |

5. A binder for attaching color pigments to the surface of granules having a quartz base which comprises the following:—

| | Pounds |
|---|---|
| Borax | 10–30 |
| Whiting | 1–10 |
| Barium carbonate | 5–20 |
| Sodium nitrate | 0–5 |
| Soda ash | 2–10 |
| China clay | 0–5 |
| Cobalt oxide | 0–0.5 |
| Feldspar | 0–10 |

6. A granule having color pigment secured to the surface thereof by a binder fused thereon, said binder comprising:

| | Pounds |
|---|---|
| Frit | 20–60 |
| Sodium silicate | 0–60 |
| Barium carbonate | 5–20 | for each ton of granules.

7. A granule having color pigment secured to the surface thereof by a binder fused thereon, said binder comprising:

| | Pounds |
|---|---|
| Borax | 10–30 |
| Whiting | 1–10 |
| Barium carbonate | 5–20 |
| Sodium nitrate | 0–5 |
| Soda ash | 2–10 |
| China clay | 0–5 |
| Cobalt oxide | 0–0.5 |
| Feldspar | 0–10 | for each ton of granules.

8. Composition roofing comprising roofing material covered on one side by granules each of which has color pigment attached thereto by a frit binder and barium carbonate fused on the surface of the granules, said barium carbonate preventing blooming on the surface of said roofing.

PAUL TEETOR.